United States Patent [19]

Spink et al.

[11] Patent Number: 5,017,346

[45] Date of Patent: May 21, 1991

[54] PROCESS FOR TREATING ZINC OXIDE BEARING MATERIALS

[75] Inventors: Donald R. Spink, Waterloo; Murry C. Robinson, Don Mills; Kim D. Nguyen, Waterloo, all of Canada

[73] Assignee: Ecolomics Inc., Don Mills, Canada

[21] Appl. No.: 192,566

[22] Filed: May 11, 1988

[30] Foreign Application Priority Data

May 13, 1987 [GB] United Kingdom ............... 8711287

[51] Int. Cl.$^5$ ................ C22B 19/00; C22B 3/00; C01G 9/00
[52] U.S. Cl. .................... 423/101; 423/106; 423/109; 75/724; 75/726; 75/743
[58] Field of Search ............... 75/711, 743, 724, 726; 423/106, 109, 101

[56] References Cited

U.S. PATENT DOCUMENTS

| 387,688 | 8/1888 | Low | 423/101 |
|---|---|---|---|
| 700,311 | 5/1902 | Ellershansen | 75/419 |
| 875,866 | 1/1908 | Sulman | 423/101 |
| 999,213 | 8/1911 | Durant | 261/114.1 |
| 1,109,113 | 9/1914 | Cutten | 423/104 |
| 1,110,660 | 9/1914 | Vadner | 423/105 |
| 1,919,947 | 7/1933 | Johnston | 423/101 |
| 3,753,692 | 8/1973 | Bourchier et al. | 75/120 |
| 4,071,357 | 1/1978 | Peters | 423/105 |
| 4,107,265 | 8/1978 | von Röpenack et al. | 423/109 |
| 4,118,458 | 10/1978 | Robinson | 423/109 |
| 4,610,721 | 9/1986 | Duyvesteyn et al. | 423/106 |
| 4,637,832 | 1/1987 | Cammi et al. | 423/106 |

FOREIGN PATENT DOCUMENTS 1179966 12/1984 Canada .
1194702 10/1985 Canada .
1195846 10/1985 Canada .

*Primary Examiner*—John Doll
*Assistant Examiner*—Steven Bos
*Attorney, Agent, or Firm*—Rogers, Bereskin & Parr

[57] ABSTRACT

A process of refining zinc oxide from roasted zinc sulphide bearing concentrates comprises leaching the concentrate in an aqueous sulphur dioxide solution under controlled conditions providing selective separation of zinc from other elements contained in the concentrate. The zinc bisulphite solution so obtained is separated from the remaining solids and is heat treated, preferably with steam, to precipitate zinc monosulphite crystals, possibly after first adding zinc dust to the solution to cement out residual copper and cadmium. The zinc monosulphite is then separated from the solution, possibly washed with water, and calcined to yield purified zinc oxide.

16 Claims, 1 Drawing Sheet

PROCESS FOR TREATING ZINC OXIDE BEARING MATERIALS

FIELD OF THE INVENTION

This invention relates to a process for treating zinc oxide bearing materials. More particularly, the invention relates to the separation of zinc from other metals contained in zinc bearing materials, such as roasted zinc sulphide concentrates, by selectively leaching the roasted concentrate in aqueous sulphur dioxide solution. This invention also relates to the production from zinc bearing materials, such as roasted zinc sulphide concentrates, of a purified, high surface area zinc oxide.

BACKGROUND OF THE INVENTION

Zinc oxide is used commercially in the formulation of rubber products, and as a feed stock for chemicals, pharmaceuticals, catalysts, fertilizers and many other products. Different characteristics may be required for different applications. Maximum concentrations of certain particular contaminants are important in some applications. In addition to purity, the physical properties of a commercial zinc oxide product, such as its particle size and shape, as well as its surface area, may also be of importance for certain applications.

Zinc occurs usually in sulphide mineral deposits. Conventionally, purified zinc oxide may be commercially produced by re-oxidizing metallic zinc which has been recovered by sulphuric acid leaching of roasted zinc sulphide concentrates followed by electrowinning. Zinc oxide may also be commercially produced by controlled oxidation of the zinc vapour which is produced by smelting roasted zinc sulphide concentrates that have been mixed with coal.

Neither of these techniques is used for the production of high surface area zinc oxide which is desirable for some commercial applications.

U.S. Pat. No. 387,688 which issued to Low on Aug. 14, 1888, teaches that zinc may be recovered from zinc ore by roasting the ore and subsequently subjecting the ore to repeated leachings in cold aqueous sulphur dioxide solution. Zinc sulphite may then be recovered from the leachate by boiling.

U.S. Pat. No. 878,866, which issued to Sulman on Jan. 7, 1908, teaches a process wherein calcined zinc sulphides are leached in aqueous sulphur dioxide solution. Zinc oxide is added to the resulting zinc bisulphite solution in order to precipitate zinc monosulphite.

U.S. Pat. No. 1,110,660, which issued to Vadner on Sep. 15, 1914, describes the leaching of zinc oxide bearing ores and calcined concentrates in sulphurous roaster gases dissolved in water. Copper is precipitated out by passing the resulting solution over iron. Oxidation and carbonate precipitation are used to remove iron and other impurities from the solution. Zinc is precipitated as basic zinc carbonate.

U.S. Pat. No. 1,919,947, which issued to Johnston on May 7, 1929, teaches a process for treating oxides containing zinc, cadmium and copper with aqueous sulphur dioxide to obtain a bisulphite solution. Cadmium and copper are claimed to be precipitated from the zinc bisulphite solution by the addition of zinc oxide. The zinc monosulphite obtained is calcined to produce zinc oxide and sulphur dioxide.

None of the processes disclosed in the above mentioned patents disclose the techniques of the present invention which produce a purified zinc oxide product.

BRIEF SUMMARY OF THE INVENTION

It has now been found that by leaching the roasted zinc sulphide concentrates in an aqueous sulphur dioxide solution, zinc may be separated in varying degrees from various metals including aluminum, iron, copper, nickel, cobalt, manganese, cadmium, lead and tin. The resulting leachate may be further purified by the addition of zinc dust at low pH for the cementation of residual copper and cadmium in the leachate. Zinc monosulphite crystals may be precipitated from the leachate by increasing the pH of the leachate preferably to a pH of at least about 4.3 but less than about 5.0 by heating the leachate thus further purifying the zinc oxide product. The zinc monosulphite crystals may be calcined to yield purified zinc oxide and wet sulphur dioxide gas. The resultant zinc oxide may also be produced so as to have a high surface area.

BRIEF DESCRIPTION OF THE DRAWING

The invention will be better understood with reference to the accompanying drawing which shows a preferred embodiment of the present invention and in which.

DESCRIPTION OF THE PREFERRED EMBODIMENT

Figure 1:
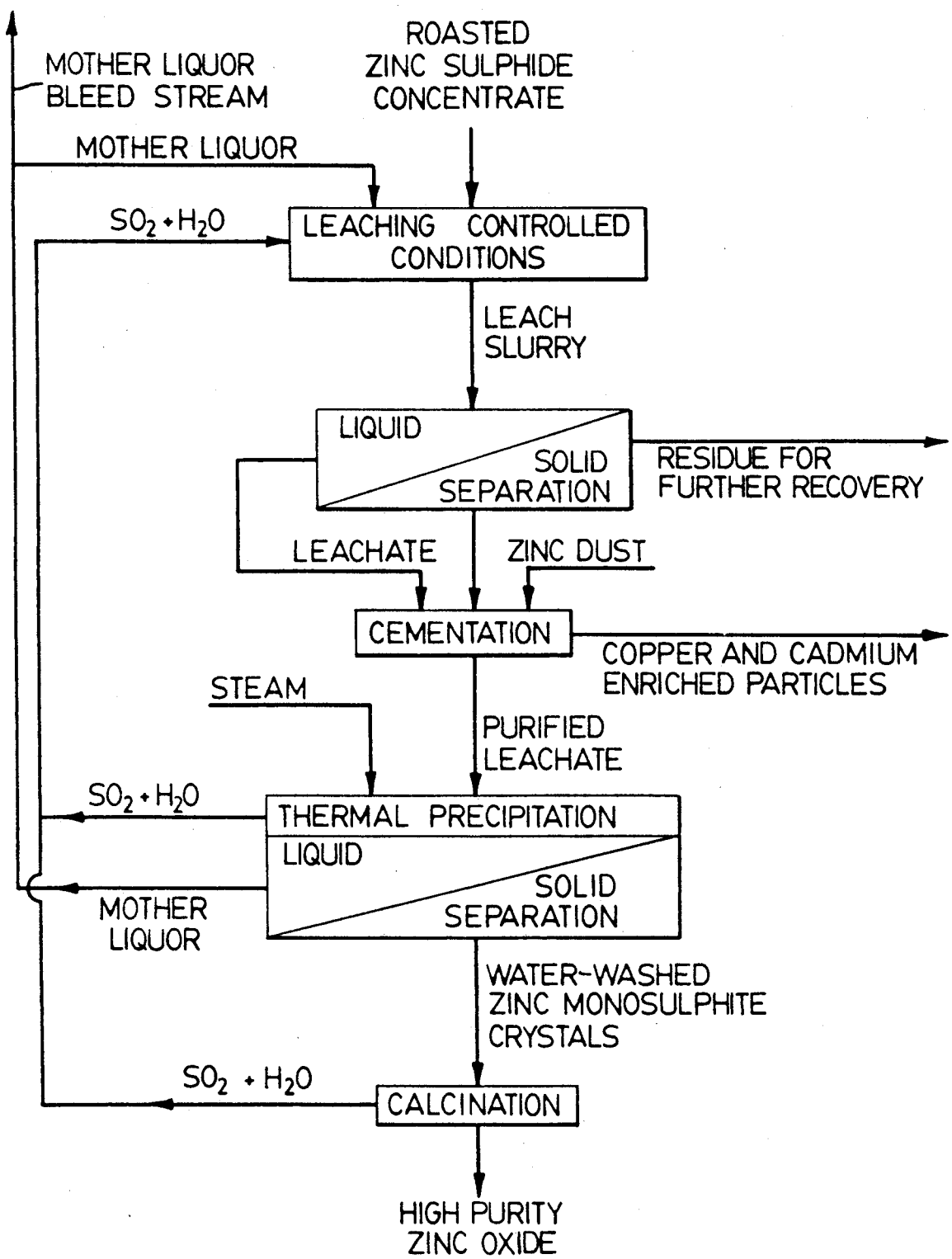
FIG. 1 is a flow sheet of an embodiment of the invention.

In accordance with the present invention, a material, such as a roasted zinc sulphide concentrate, which contains zinc oxide and other substances, and which may include cadmium, iron, copper, manganese, magnesium, lead, calcium, silicon, cobalt, tin, aluminum and nickel is leached by slurrying it in an aqueous sulphur dioxide solution.

It has been found that the leaching conditions can be controlled to effect a selective separation of zinc from all of the above elements except calcium, magnesium and silicon. However, these latter elements are selectively separated in a later heat treatment step. The degree of separation with respect to copper is only moderate, but copper may be further removed by subsequent processing. The aqueous sulphur dioxide leaching process of the present invention uses those combinations of feed pulp density, pH, and temperature which allow dissolution of zinc and which generally limit the codissolution of other substances which may be present in the feed material. The leaching may be conducted by maintaining the slurry at a feed pulp density from about 100 to about 350 grams per liter, a temperature from about 0° C. to about 25° C., and a pH from about 2.0 to about 3.5 and adjusting the residence time to maximize the zinc extraction as related to the extraction of the indicated impurities. Within these ranges, the leaching conditions may be chosen to limit the overall codissolution of the other substances, or they may be chosen with the aim of specifically limiting the codissolution of one or more particular substance or substances.

The precise leaching conditions which are utilized depends upon three main factors, namely, the composition of the roasted zinc concentrate, the purity of the zinc oxide product which is desired, and the desired amount of zinc recovery. Generally speaking, a short residence time will be required to maximize the purification achieved in the leaching step.

It has been found that zinc may be more effectively separated from aluminum, nickel, manganese, lead, tin and cobalt over a fairly wide range of leaching conditions but that effective separation of zinc from iron, cadmium and to some extent copper is considerably more dependant upon the selection of appropriate operating conditions. It has been found that the codissolution of iron is most effectively limited when the leaching conditions are in the following ranges:

(a) a feed pulp density from about 100 to about 350 grams per liter;
(b) a pH from about 2.0 to about 3.3;
(c) a leach time from about 2 to about 20 minutes; and,
(d) a temperature between about 0° C. and about 25° C.

In order to obtain a substantial purification with respect to both cadmium and iron, it is preferred that the leaching conditions are in the following ranges:

(a) a feed pulp density of about 250 to 325 grams per liter;
(b) a pH of about 2.0 to 3.3;
(c) a residence time of less than about 15 minutes; and,
(d) a temperature between about 3° C. and about 25° C.

The leach residue may be subjected to an additional leach using aqueous sulphur dioxide in order to increase the recovery of zinc. This second leachate may be further treated with aqueous sulphur dioxide to obtain a lower purity zinc oxide product. A secondary leach step may be conducted by using sulphuric acid.

After leaching, the leachate, which is substantially zinc bisulphite solution, may be separated from the remaining dissolved material by conventional liquid-solid separation means.

Depending upon the purity requirements of the zinc oxide product, the leachate may be subjected to one or more cementation steps. This may be required if a zinc oxide product having low levels of cadmium or copper is desired.

In the cementation step, pure zinc dust is added to the leachate. In this way, the codissolved metals of cadmium and copper can be removed from the leachate.

Preferably, the cementation conditions are in the following ranges:

(a) a pH of from about 3.2 to about 3.8;
(b) a cementation time of from about 5 minutes to about 10 minutes;
(c) a temperature between about 20° C. and about 35° C.; and,
(d) an addition rate of pure zinc dust from about 1.0 grams per liter to about 3.0 grams per liter.

The slurry which results from the cementation stage is subjected to liquid-solid separation in order to separate the solid cementation product from the leachate.

The leachate which is a refined zinc bisulphite solution is next subjected to a precipitation step so as to obtain zinc monosulphite. Preferably, this precipitation step is accomplished by heat treatment. Steam may be used so as to heat the leachate to a temperature between about 90° C. and the boiling point of the leachate. This results in the evolution of sulphur dioxide gas and water vapour, and the formation of a zinc salt which is substantially pure zinc monosulphite. The zinc monosulphite precipitates out of solution. It has been found that certain substances which include silicon, calcium and magnesium, which may be codissolved during leaching tend to remain in the mother liquor during such precipitation operations so that the precipitated zinc monosulphite is generally purer than the treated zinc bisulphite solution.

As the leachate is heated, the zinc bisulphite is converted to zinc monosulphite. During this heat treatment step, the pH of the leachate increases. The pH of the leachate at the end of this stage is less than 5.0 and, preferably, the pH is in the range of about 4.3 to about 4.8 and, most preferably at about 4.5.

The precipitated zinc monosulphite may subsequently be separated from the depleted leachate by conventional liquid-solid separation means and then calcined to produce a purified zinc oxide product and sulphur dioxide gas for recycle. Alternatively, the precipitated zinc salt may be washed with water prior to being calcined in order to remove any depleted leachate which may be trapped in the salt.

The zinc monosulphite is calcined in an oxygen free environment in order to obtain zinc oxide. If it is desired to obtain a zinc oxide product having a high surface area, it is preferred that the calcination occur at a temperature from about 275° C. to about 600° C. and, most preferably, at a temperature of about 500° C. In order to further increase the surface area of the resultant zinc oxide product at a given temperature, the calcination may occur under vacuum. However, if a zinc oxide product having conventional physical properties is acceptable, the zinc monosulphite may be calcined at a temperature of about 800° C. to about 950° C.

The resultant zinc oxide may be subsequently washed after the calcination. During the calcination, some zinc sulphate may form. By washing the zinc oxide with water, the zinc sulphate, which is more readily soluble, is preferentially removed leaving a zinc oxide product having an increased purity.

In another embodiment, the roasted zinc concentrate, if amenable, is washed in water to remove soluble calcium and cadmium salts prior to being subjected to the leaching stage.

In another embodiment of the invention, more than one leaching and cementation stages may be included as well as means for recovering and recycling the mother liquor, water, sulphur dioxide, heat and other process agents.

The following examples will help to further demonstrate the invention.

EXAMPLE 1

A sample of roasted zinc sulphide concentrate was indiscriminately leached in aqueous sulphur dioxide solution. The assay of the roasted concentrate feed material was as follows:

| Element | Percent by Weight |
| --- | --- |
| Zn | 66.85 |
| Fe | 8.55 |
| Cu | 0.67 |
| Cd | 0.32 |
| Mn | 0.02 |
| Al | 0.11 |
| Co | 0.02 |
| Mg | 0.07 |
| Si | 0.24 |
| Ca | 0.06 |

The leaching conditions were measured to be as follows:
feed pulp density: 120 grams per liter
pH: 2.0
residence time: 60 minutes
temperature: 20° C. to 22° C.
pressure: atmospheric The leachate was separated from the remaining undissolved material and subsequently analyzed. The analysis of the leachate was reported to be as follows:

| Element | Concentration (gpl) |
|---|---|
| Zn | 62.8 |
| Fe | 0.90 |
| Cu | 0.49 |
| Cd | 0.31 |
| Mn | 0.005 |
| Al | 0.006 |
| Co | 0.008 |
| Mg | 0.05 |
| Si | 0.30 |
| Ca | 0.06 |

The selective separation factor is calculated as the weight ratio of zinc tO the other element in the leachate compared to the weight ratio of zinc to the other element in the feed. The selectiVe separatiOn factOrs for this leach were calculated as follows:

| Element | Selective Separation Factor |
|---|---|
| Fe | 8.89 |
| Cu | 1.28 |
| Cd | 0.96 |
| Mn | 3.20 |
| Al | 17.09 |
| Co | 1.88 |
| Mg | 1.25 |
| Si | 0.76 |
| Ca | 0.92 |

The higher the selective separation factor, the better the separation of the zinc from the compound being considered.

EXAMPLE 2

A sample of roasted sulphide concentrate was indiscriminately leached in aqueous sulphur dioxide solution. The assay of the roasted concentrate feed material is shown in Table 1.

The leaching conditions were measured to be as follows:
feed pulp density: 120 grams per liter
pH: 1.5 to 2.6
residence time: 30 minutes
temperature: 22° C. to 55° C.
pressure: atmospheric The leachate was separated from the remaining undissolved material and subsequently analyzed. The analysis of the leachate is also shown in Table 1.

The selective separation factors were calculated in the manner described in Example 1, and are also tabulated in Table 1.

TABLE 1

| Element | Percent by Weight (feed) | Concentration in Leachate (gpl) | Selective Separation Factor |
|---|---|---|---|
| Zn | 67.8 | 67.5 | — |
| Fe | 8.67 | 0.62 | 13.8 |

TABLE 1-continued

| Element | Percent by Weight (feed) | Concentration in Leachate (gpl) | Selective Separation Factor |
|---|---|---|---|
| Cu | 0.64 | 0.50 | 1.27 |
| Cd | 0.33 | 0.30 | 1.09 |
| Mn | 0.02 | 0.006 | 3.33 |
| Al | 0.18 | 0.009 | 20.8 |
| Co | — | — | — |
| Mg | 0.08 | 0.05 | 1.47 |
| Si | 0.08 | 0.33 | 0.24 |
| Ca | 0.64 | 0.86 | 0.74 |

EXAMPLE 3

A sample of roasted zinc sulphide concentrate was leached in aqueous sulphur dioxide solution in accordance with the present invention. The assay of the roasted concentrate feed material is listed in Table 2. The leaching conditions were measured as follows:
feed pulp density: 120 grams per liter
pH: 2.0
residence time: 10 minutes
temperature: 5° C.
pressure: atmospheric The leachate was separated from the remaining undissolved material and subsequently analyzed. The analysis of the leachate, together with the selective separation factors as described in Example 1, are shown in Table 2.

TABLE 2

| Element | Percent by Weight (feed) | Concentration in Leachate (gpl) | Selective Separation Factor |
|---|---|---|---|
| Zn | 63.14 | 45.00 | — |
| Fe | 9.84 | 0.12 | 61.0 |
| Cu | 0.92 | 0.39 | 1.6 |
| Cd | 0.32 | 0.18 | 1.3 |
| Mn | 0.03 | 0.003 | 6.4 |
| Al | 0.13 | 0.003 | 31.0 |
| Co | 0.02 | 0.004 | 2.9 |
| Mg | 0.08 | 0.03 | 1.9 |
| Si | 0.41 | 0.16 | 2.0 |
| Ca | 0.06 | 0.05 | 0.93 |

EXAMPLE 4

A sample of roasted zinc sulphide concentrate was leached using aqueous sulphur dioxide solution in accordance with the present invention. The assay of the roasted concentrate feed is shown in Table 3.

The leaching conditions were measured to be as follows:
feed pulp density: 300 grams per liter
pH 3.0
residence time: 10 minutes
temperature: 20° C. to 22° C.
pressure: atmospheric The leachate was separated from the remaining undissolved material and subsequently analyzed. The analysis of the leachate together with the calculated selective separation factors are listed in Table 3.

TABLE 3

| Element | Percent by Weight (feed) | Concentration in Leachate (gpl) | Selective Separation Factor |
|---|---|---|---|
| Zn | 63.29 | 43.25 | — |
| Fe | 9.73 | 0.18 | 37.0 |
| Cu | 0.95 | 0.14 | 4.64 |
| Cd | 0.33 | 0.02 | 11.3 |
| Mn | 0.03 | 0.008 | 2.56 |
| Al | 0.12 | 0.004 | 20.5 |

TABLE 3-continued

| Element | Percent by Weight (feed) | Concentration in Leachate (gpl) | Selective Separation Factor |
| --- | --- | --- | --- |
| Co | 0.02 | 0.008 | 1.71 |
| Mg | 0.08 | 0.064 | 0.854 |
| Si | 0.48 | 0.037 | 8.87 |
| Ca | 0.06 | 0.12 | 0.34 |

Examples 1 and 2 demonstrate the effect of an indiscriminate leach. In these examples, a high residence time was employed. As a result, the codissolution of other elements was not limited. Example 3 demonstrates a discriminent leach in accordance with the present invention wherein a low pulp density and a low pH was employed. In Example 4, a selective leach using high feed pulp density and a higher pH is demonstrated.

In Examples 1 and 2, the selective separation factors for iron were only 8.89 and 13.8 respectively. On the other hand, the selective separation factors for iron in Examples 3 and 4 were 61.0 and 37.0 respectively. Thus, an improved separation of iron and zinc was obtained using the discriminate leach of the present invention.

In Example 4, a discriminant leach was conducted using a higher pH and feed pulp density than Example 3. The selective separation factor for cadmium in Example 4 was 11.3 while the selective separation factor for cadmium in the indiscriminant leaches of Examples 1 and 2 were 0.96 and 1.09 respectively. Thus, the high pH, high feed pulp density leaching conditions of this Example resulted in a high leaching selectivity of zinc over cadmium while still maintaining a high leaching selectivity of zinc over iron which is demonstrated in Example 3.

EXAMPLE 5

A sample of roasted zinc sulphide concentrate was leached in aqueous sulphur dioxide solution under the following conditions:
feed pulp density: 300 grams per liter
pH 3.0
temperature: 20° C.–22° C.
residence time: 10 minutes The leachate was subsequently separated from the undissolved matter. The assay of the roasted concentrate feed material and the separated leachate are listed in Table 4.

TABLE 4

| Element | Percent by Weight (feed) | Concentration in Leachate (gpl) |
| --- | --- | --- |
| Zn | 63.09 | 70.5 |
| Fe | 12.33 | 0.30 |
| Cu | 0.93 | 0.66 |
| Cd | 0.33 | 0.099 |
| Mn | 0.02 | 0.003 |
| Al | 0.14 | 0.005 |
| Co | 0.02 | 0.012 |
| Mg | 0.07 | 0.035 |
| Si | 0.39 | 0.067 |
| Ca | 0.08 | 0.114 |

The leachate was subsequently heated to a temperature of 90° C. at a pH of 4.5 whereupon zinc monosulphite was precipitated. The zinc salt was separated from the leachate and analyzed. The results of the analysis of the zinc monosulphite crystals obtained are shown in Table 5.

The separated zinc salt was then calcined at 500° C. for one hour to produce a zinc oxide product which was subsequently analyzed. The results of the analysis are shown in Table 5.

The overall purification of zinc oxide produced by the process relative to any other substance in the feed material is reflected by the ratio of the percentage of zinc in the product to the percentage of the other substance in the product as compared with the percentage of zinc in the feed material to the percentage of the other substance in the feed. The ratio may be called the "overall purification factor".

The overall purification factors resulting from the leaching, thermal decomposition and calcination steps shown in this example are tabulated in Table 5.

TABLE 5

| Element | Percent by Weight in Zinc Monosulphite | Percent by Weight in Calcined ZnO | Overall Purification Factor |
| --- | --- | --- | --- |
| Zn | 43.43 | 80.4 | |
| Fe | 0.13 | 0.345 | 45.5 |
| Cu | 0.34 | 0.836 | 1.42 |
| Cd | 0.04 | 0.074 | 5.68 |
| Mn | 0.001 | 0.003 | 8.50 |
| Al | 0.005 | 0.015 | 11.9 |
| Co | 0.006 | 0.017 | 1.50 |
| Mg | 0.005 | 0.009 | 9.91 |
| Si | 0.003 | 0.010 | 49.7 |
| Ca | 0.003 | 0.003 | 34.0 |

EXAMPLE 6

Samples of roasted zinc sulphide concentrate were leached in aqueous sulphur dioxide solution. The assay of the roasted concentrate feed material was as follows:

| Element | Percent by Weight |
| --- | --- |
| Zn | 63.29 |
| Fe | 9.733 |
| Cu | 0.954 |
| Cd | 0.331 |
| Mn | 0.027 |
| Al | 0.123 |
| Co | 0.016 |
| Mg | 0.080 |
| Si | 0.479 |
| Ca | 0.063 |

The leaching conditions were measured to be as follows:
feed pulp density: 120 grams per liter
pH: 2.0
residence time: various times between 10 minutes and 60 minutes
temperature: various temperatures between 5° C. and 50° C.
pressure: atmospheric The leachates were separated from the remaining undissolved material and subsequently analyzed for zinc and iron. The analysis of the leachates were reported to be as shown below in Table 6 together with the selective separation factor for iron.

TABLE 6

| Leach Time | Temperature | Element | Concentration (gpl) | Element | Concentration (gpl) | Selective Separation Factor |
| --- | --- | --- | --- | --- | --- | --- |
| 10 min. | 5° C. | Zn | 44.8 | Fe | 0.104 | 66.2 |
| 10 min. | 10° C. | Zn | 48.5 | Fe | 0.143 | 52.2 |
| 10 min. | 20° C. | Zn | 60.5 | Fe | 0.191 | 48.8 |
| 20 min. | 5° C. | Zn | 51.5 | Fe | 0.151 | 52.5 |

TABLE 6-continued

| Leach Time | Temperature | Element | Concentration (gpl) | Element | Concentration (gpl) | Selective Separation Factor |
|---|---|---|---|---|---|---|
| 20 min. | 20° C. | Zn | 61.5 | Fe | 0.201 | 47.1 |
| 60 min. | 20° C. | Zn | 62.8 | Fe | 0.903 | 8.89 |
| 60 min. | 50° C. | Zn | 65.5 | Fe | 1.84 | 4.55 |

It is demonstrated in this example that low temperature, short duration, aqueous sulphur dioxide leaching provides for improved separation between iron and zinc. This is best reflected by higher selective separation factors for the leachate which used both low temperatures and short duration times.

EXAMPLE 7

A sample of roasted zinc sulphide concentrate was heated in air at 810° C. for 3 hours. The air flow rate was 3 cubic feet per hour. The assay of the concentrate feed material, prior to heating, is shown in Table 7.

The re-roasted concentrate feed material was then water washed in accordance with another embodiment of the present invention. The assay of the water washed material is shown in Table 7. The water washed material was leached in aqueous sulphur dioxide solution in accordance with the present invention. The leaching conditions were measured to be as follows:

feed pulp density: 300 grams per liter
pH: 3.0
residence time: 10 minutes
temperature: between 20° C. and 22° C.

The leachate was separated from the remaining undissolved material and subsequently analyzed. The analysis of the leachate is also shown in Table 7.

TABLE 7

| Element | Weight Percent in Feed | Weight Percent in Washed Feed | Concentration in leachate (gpl) |
|---|---|---|---|
| Zn | 66.85 | 69.61 | 27.15 |
| Cd | 0.318 | 0.107 | 0.004 |
| Fe | 8.552 | 8.828 | 0.054 |
| Cu | 0.670 | 0.673 | 0.062 |
| Mg | 0.066 | 0.053 | 0.024 |
| Mn | 0.017 | 0.019 | 0.005 |
| Pb | 0.072 | 0.062 | — |
| Ca | 0.058 | 0.018 | 0.014 |
| Si | 0.313 | 0.303 | 0.093 |
| Co | 0.016 | 0.017 | 0.007 |
| Sn | 0.081 | 0.077 | — |
| Al | 0.114 | 0.141 | 0.002 |
| Ni | 0.002 | 0.002 | — |

The leachate was next subjected to two cementation stages. The cementation conditions for each of the two stages were measured to be as follows:

First Stage pH: 3.2-3.4
Temperature: 25° C.
Time: 5 minutes
Rate of zinc addition: 2 grams per liter.

Second Stage pH: 3.4-3.6
Temperature: 25° C.
Time: 5 minutes
Rate of zinc addition: 2 grams per liter
After each stage, the purified leachate was separated from the resultant solid material and analyzed. The analysis of the purified leachate resulting from each stage of the cementation is shown in Table 8.

The purified leachate from the second cementation stage was subjected to a heat treatment with live steam. The process conditions for the heat treatment were as follows:

Temperature: between 96° C. and 100° C.
Time: 10-15 minutes
pH 4.5-4.7

The resultant zinc monosulphite crystals were divided into two samples. One of these samples was subjected to calcination under vacuum. The other of these samples was subjected to calcination at normal pressure. The following were the process conditions for the calcination:

| Parameter | Calcination under Vacuum | Calcination at Normal Pressure |
|---|---|---|
| Temperature | 300° C. | 500° C. |
| Time | 1 hour | 1 hour |
| Pressure | 61-68 cm Hg | about 1 atm |

The resultant calcined zinc oxide which was produced under each of the above calcination conditions was subsequently washed with water and analyzed. The analysis of the resultant zinc oxide product produced by the atmospheric calcination, together with the overall purification factors, are shown in Table 8.

TABLE 8

| Element | Concentration after Cementation (gpl) First Stage | Concentration after Cementation (gpl) Second Stage | Weight Percent in Calcined Product (atmospheric pressure) | Overall Purification Factor Based on Washed Feed |
|---|---|---|---|---|
| Zn | 24.65 | 23.00 | 79.18 | — |
| Cd | 0.002 | 0.001 | 0.004 | 30.4 |
| Fe | 0.049 | 0.056 | 0.128 | 78.5 |
| Cu | 0.025 | 0.004 | 0.016 | 47.9 |
| Mg | — | — | 0.007 | 8.61 |
| Mn | — | — | 0.001 | 21.6 |
| Pb | — | — | — | — |
| Ca | 0.015 | 0.017 | 0.006 | 3.4 |
| Si | — | — | 0.018 | 19.2 |
| Co | — | — | 0.014 | 5.2 |
| Sn | — | — | 0.001 | 87.6 |
| Al | — | — | 0.010 | 16.0 |
| Ni | — | — | 0.001 | 2.3 |

The specific surface area of the various zinc oxide products were measured and recorded to be as follows:

| Pressure | Washed ZnO (m²/g) | Unwashed ZnO (m²/g) |
|---|---|---|
| vacuum | 49.52 | 66.45 |
| atm pressure | 17.58 | |

As shown in Table 7, the concentration of cadmium in the washed feed was 0.107 weight percent while that in the unwashed feed was 0.318 weight percent. Similarly, the washing of the feed resulted in a decrease in the concentration of calcium from 0.058 to 0.018. Thus, by washing the re-roasted zinc sulphide concentrate, the purity of the concentrate with respect to calcium and cadmium was increased.

Table 8 demonstrates that the cementation stages are very effective in purifying the leachate with respect to cadmium and copper. The second cementation stage has only a small effect upon the purity of the leachate and as a result, would preferably be only used if a very high purity zinc oxide product was desired.

As demonstrated above, it can be seen that the effect of calcining the zinc oxide product under vacuum dramatically increases the specific surface area of the resultant product.

Both Examples 5 and 7 demonstrate a discriminate leach conducted at a high feed pulp density had a high pH. In Example 7, the zinc bisulphite was subjected to two cementation stages. The overall purification factors for copper and cadmium obtained in Example 7 were 47.9 and 30.4 respectively. On the other hand, overall purification factors for copper and cadmium obtained in Example 5 were 1.42 and 5.68 respectively. As can be seen, the addition of the cementations stages in Example 7 were effective in improving the separation of cadmium and copper from the resultant zinc oxide product.

EXAMPLE 8

A sample of roasted sulphide concentrate was leached in aqueous sulphur dioxide solution in accordance with the present invention. The leaching conditions were measured to be as follows:

feed pulp density: 300 grams per liter
pH: 3.0
temperature: between 20° C. and 22° C.
residence time: 10 minutes The leachate was separated from the remaining undissolved material and subsequently analyzed. The analysis of the roasted zinc concentrate and leachate together with the calculated selective separation factors are listed in Table 9.

TABLE 9

| Element | Weight Percent in Feed | Concentration in leachate (gpl) | Selective Separation Factor |
|---|---|---|---|
| Zn | 67.02 | 46.0 | — |
| Cd | 0.357 | 0.072 | 3.40 |
| Fe | 8.569 | 0.317 | 18.6 |
| Cu | 0.693 | 0.297 | 1.60 |
| Mg | 0.070 | 0.038 | 1.26 |
| Mn | 0.017 | 0.003 | 3.89 |
| Pb | 0.075 | — | high |
| Ca | 0.059 | 0.062 | 0.653 |
| Si | 0.218 | 0.040 | 3.74 |
| Co | 0.017 | 0.006 | 1.94 |
| Sn | 0.052 | 0.002 | 17.8 |
| Al | 0.120 | 0.003 | 27.5 |
| Ni | 0.002 | — | — |

The leachate was subsequently heated using an electric mantle. At a pH of 3.4 and a temperature of 71° C., some off-white precipitate started to form. As the thermal decomposition progressed, the solution colour turned slightly grayish. At a solution pH of 4.5 and a temperature of 95° C., the thermal decomposition stage was stopped. The resultant grayish precipitate of zinc monosulphite was separated from the leachate and analyzed. The results of the analysis are contained in Table 10.

The zinc monosulphite was calcined at a temperature of 500° C. in a $N_2$ steam atmosphere for one hour. The resultant zinc oxide product was subsequently washed. The analysis of the washed and unwashed zinc oxide products are also shown in Table 10.

TABLE 10

| Element | Weight Percent in Zinc Monosulphite | Weight Percent in Unwashed Calcined ZnO | Weight Percent in Washed Calcined ZnO |
|---|---|---|---|
| Zn | 43.76 | 79.98 | 80.3 |
| Cd | 0.090 | 0.168 | 0.076 |
| Fe | 0.254 | 0.492 | 0.527 |
| Cu | 0.383 | 0.557 | 0.589 |
| Mg | 0.006 | 0.012 | 0.006 |
| Mn | 0.003 | 0.005 | 0.004 |
| Pb | 0.001 | 0.006 | 0.003 |
| Ca | 0.004 | 0.007 | 0.005 |
| Si | 0.004 | 0.004 | 0.004 |
| Co | 0.006 | 0.012 | 0.011 |
| Sn | 0.004 | 0.004 | 0.004 |
| Al | 0.007 | 0.011 | 0.011 |
| Ni | — | — | 0.001 |

EXAMPLE 9

A sample of roasted, washed zinc sulphide concentrate was indiscriminately leached in aqueous sulphur dioxide solution. The leaching conditions were measured to be as follows:

feed pulp density: 60 grams per liter
pH: 1.5–2.1
temperature: 30° C. to 40° C.
residence time: 2 hours The leachate was separated from the remaining undissolved material and subsequently analyzed. The analysis of the roasted zinc concentrate and leachate together with the calculated selective separation factors are listed in Table 11.

TABLE 11

| Element | Weight Percent in Feed | Concentration leachate (gpl) | Selective Separation Factor |
|---|---|---|---|
| Zn | 70.23 | 38.9 | — |
| Cd | 0.198 | 0.109 | 1.01 |
| Fe | 9.51 | 1.885 | 2.8 |
| Cu | 0.69 | 0.301 | 1.27 |
| Mg | 0.075 | 0.027 | 1.54 |
| Mn | 0.02 | 0.004 | 2.77 |
| Pb | 0.07 | 0.001 | 38.7 |
| Ca | 0.262 | 0.131 | 1.11 |
| Si | 0.101 | 0.191 | 0.29 |
| Co | 0.018 | 0.006 | 1.66 |
| Sn | 0.17 | — | high |
| Al | 0.17 | 0.011 | 8.56 |

As shown in the above table, the selective separation factors for cadmium and iron obtained using a indiscriminate leach were 1.01 and 2.8 respectively. The selective separation factors obtained using the discriminate leach detailed in Example 8 resulted in selective separation factors of 3.4 and 18.6 respectively for cadmium and iron.

We claim:
1. A process for the refining of zinc oxide bearing material comprising the steps of:
   (a) leaching the zinc oxide bearing material by slurrying it in an aqueous sulphur dioxide solution, maintaining the slurry at a feed pulp density of about 100 to about 350 grams per liter, a temperature of about 0° C. to about 25° C., a pH value from about 2.0 to about 3.5, and the leaching residence time is adjusted to obtain maximum extraction of zinc consistent with minimum extraction of impurities;
   (b) subjecting the leach slurry of step (a) to liquid-solid separation to yield a zinc bearing leachate and a zinc depleted residue;

(c) precipitating zinc monosulphite crystals from said leachate to produce a zinc depleted mother liquor by increasing the pH of the leachate not to exceed about 5.0 by heat treating said leachate;

(d) subjecting the leachate of step (c) to liquid-solid separation to yield a zinc depleted mother liquor and zinc monosulphite crystals;

(e) recycling the zinc depleted mother liquor to step (a); and, (f) calcining the separated zinc monosulphite crystals to yield purified zinc oxide and wet sulphur dioxide gas, said gas being subsequently returned to leaching step (a).

2. A process as claimed in claim 1 wherein the zinc bearing leachate of step (b) is further purified by one or more steps of adding zinc dust for cementation of residual copper and cadmium in the leachate to produce a purified leachate and cemented metals, said cemented metals being removed from said leachate prior to said leachate being subjected to precipitation step (c).

3. A process as claimed in claim 2 wherein said leachate is subjected to two cementation steps.

4. A process as claimed in claim 1 or 2 wherein said separated zinc monosulphite of step (d) is washed with water to remove entrapped mother liquor before being subjected to calcination step (f).

5. A process as claimed in claim 1 or 2 wherein the purified zinc oxide of step (f) is washed with water for removal of sulphates formed during calcination step (f).

6. A process as claimed in claim 1 or 2 wherein the residence time varies from about 2 minutes to about 20 minutes.

7. A process as claimed in claim 1 or 2 wherein the aqueous sulphur dioxide leaching is conducted at a feed pulp density of between 250 and 325 grams per liter, a pH of 2.7 and 3.3, a temperature from about 3° C. to about 25° C. and the residence time is less than 15 minutes.

8. A process as claimed in claim 2 wherein said cementation is conducted at a pH from about 3.2 to about 3.8, a temperature of about 20° C. to about 35° C., the process time varies from about 5 to about 10 minutes and the rate of zinc addition to the leachate is from about 1.0 grams per liter to about 3.0 grams per liter.

9. A process as claimed in claim 1 wherein said heat treatment is conducted between about 90° C. and the boiling point of the leachate.

10. A process as claimed in claim 1 wherein the pH at the end of precipitation step (c), is in the range of about 4.3 to about 4.8.

11. A process as claimed in claim 10 wherein the pH is not allowed to exceed about 4.5.

12. A process as claimed in claim 1 wherein the calcination of the zinc monosulphite crystals is conducted in an oxygen free environment between 275° C. and about 950° C.

13. A process as claimed in claim 12 wherein the calcination is conducted at a temperature between about 275° C. and about 600° C.

14. A process as claimed in claim 13 wherein the calcination is conducted under vacuum.

15. A process as claimed in claim 1 or 2 wherein the zinc oxide bearing material is first washed with water for dissolving soluble cadmium and calcium salts contained therein to yield a wash water and a partially purified zinc oxide bearing material, said partially purified zinc oxide bearing material being subjected to leaching step (a).

16. A process as claimed in claim 1, 2 or 3 wherein the zinc oxide bearing material comprises a roasted zinc sulphide bearing concentrate.

* * * * *